ROBERT E. FEARON
DANIEL SILVERMAN
INVENTORS

BY Newell Pottorf
ATTORNEY

ROBERT E. FEARON
DANIEL SILVERMAN
*INVENTORS*

BY Newell Pottoy
*ATTORNEY*

June 2, 1959  D. SILVERMAN ET AL  2,889,000
SEISMIC SURVEYING

Filed Sept. 13, 1951  4 Sheets-Sheet 3

ROBERT E. FEARON
DANIEL SILVERMAN
   *INVENTORS*

BY *Newell Pottorf*

*ATTORNEY*

ROBERT E. FEARON
DANIEL SILVERMAN
*INVENTORS*

BY Newell Pottoff
*ATTORNEY*

United States Patent Office 2,889,000
Patented June 2, 1959

2,889,000
SEISMIC SURVEYING

Daniel Silverman and Robert E. Fearon, Tulsa, Okla., assignors to Pan American Petroleum Corporation, a corporation of Delaware Application September 13, 1951, Serial No. 246,374

10 Claims. (Cl. 181—.5)

This invention relates to seismic geophysical surveying and is directed particularly to the recording of received seismic signals with an improved discrimination against noise or unwanted signals or, in other words, with an improved seismic signal-to-noise ratio.

As the term "noise" is used in this specification, it may include not only noise of a generally random character, but also seismic signals which occur so close together in time that they are difficult to separate or resolve, or seismic signals reaching the detectors by unknown paths or from unwanted directions. The most commonly used discrimination against noise has been based on the amplitude, the frequency, and the time-phase relation of multiple signals. Normally, a part of this discrimination has been performed by filters in the recording system, or by the combination of such filters with the frequency-response characteristics of other elements of the system such as the seismometer and the galvanometer. Another part of the discrimination has been done by the eye of the interpreter in the visual analysis of the records. Still additional discrimination has been provided by the additive or other compounding of multiple-signal inputs.

While the compounding of inputs and the visual analysis of the records are generally recognized as excellent ways of discriminating against unwanted noise, the filtering process commonly employed and the inherent frequency-response characteristics of the detecting system components often produce changes in the "character" of the recorded waves that deceive rather than aid in the analysis of the records. The tendency for a system having a limited frequency-response range is to impress on the recorded waves the peak frequency of the system itself, regardless of whether a given wave is a signal or a noise in origin, rather than to record the waves more nearly in their original form, which might be of more assistance to the eye in judging whether a given event is a signal or a noise.

A primary object of our invention, therefore, is to provide a method and apparatus for improving the recording and analysis of seismic waves. Other and more specific objects may be briefly stated as: to provide a method and apparatus for (1) further assisting the visual interpretation of seismic records by making more evident the occurrence of in-phase energy; (2) taking full advantage of noise cancellation by additive compounding before further improving on the compounding to get a better signal-to-noise ratio; (3) discriminating against noise and in favor of desired seismic waves on the basis of their arbitrary character as wavelets of limited length rather than their frequency content or range of frequencies; (4) improving the discrimination against noise by a greater sensitivity to the relative phase of signals and noise occurring in different traces; (5) emphasizing the occurrence of waves on different traces which correlate with each other or with a pattern or noise-free wave form; (6) determining the approximate correlation functions of the received seismic waves, either with each other or with an artificial wave of arbitrary form; (7) obtaining a plurality of such correlation functions as parallel traces for visual comparison to determine the presence of signals; (8) forming a single trace which is the best average trace of the correlation functions available among the separate seismic-wave input signals; (9) combining a given number of input signals in as many ways as possible to produce noise cancellation or reduction and to form a single summary trace representing the plurality of inputs or traces; and (10) to determine the best possible correlation between a plurality of such summary traces from different profiles, for extending correlations.

The foregoing and other objects are accomplished, in accordance with our invention, by a method of recording and/or analyzing the seismic waves received at a plurality of points which involves the steps of multiplying the received waves by each other or by a pattern-wave function to provide one or more product functions, integrating the product function or functions over a substantial period of time, preferably at least as long as the period of a predominant seismic wave to be detected and typically somewhat longer, and recording the varying value of the resulting integral.

The occurrence of in-phase energy during such an analysis process results in increasing values of the recorded integral, which, together with the characteristic time or rate of increase and with the occurrence of similar increases on multiple traces, can be utilized in determining the presence of the desired seismic waves. More specifically, our invention comprises forming as many multiplied products of the different signals from a given number of wave-reception points as possible, and recording the separate products, after integration, as a function of time on a record which may be visually inspected for the occurrence of the characteristic increases in integral value.

Alternatively, where the form of the seismic signal is known or can be determined relatively free from noise, this pattern may be used in forming the product functions, in order to test the received-wave traces for the presence of the known or noise-free wave form. The records made in this latter type of analysis are preferably indications of the varying integral values as a function of the relative displacement or time phase between the recorded traces and the known or pattern trace. This time phase is varied, and the multiplication and integration steps are repeated cyclically to produce the resulting correlation function. Peaks appearing in this function are readily interpreted in terms of the occurrence of energy in the received waves having the known or noise-free form, and this information can be utilized either directly or in studying the waves recorded on conventional traces for finding the desired signals.

This will be better understood by reference to the accompanying drawings forming a part of this application and illustrating certain embodiments of our invention. In the different figures of these drawings the same reference numerals are applied to the same or corresponding parts. In these drawings, Figure 1 is a diagrammatic illustration of a portion of earth in cross section, with an embodiment of the invention in recording position thereon;

Figure 1:
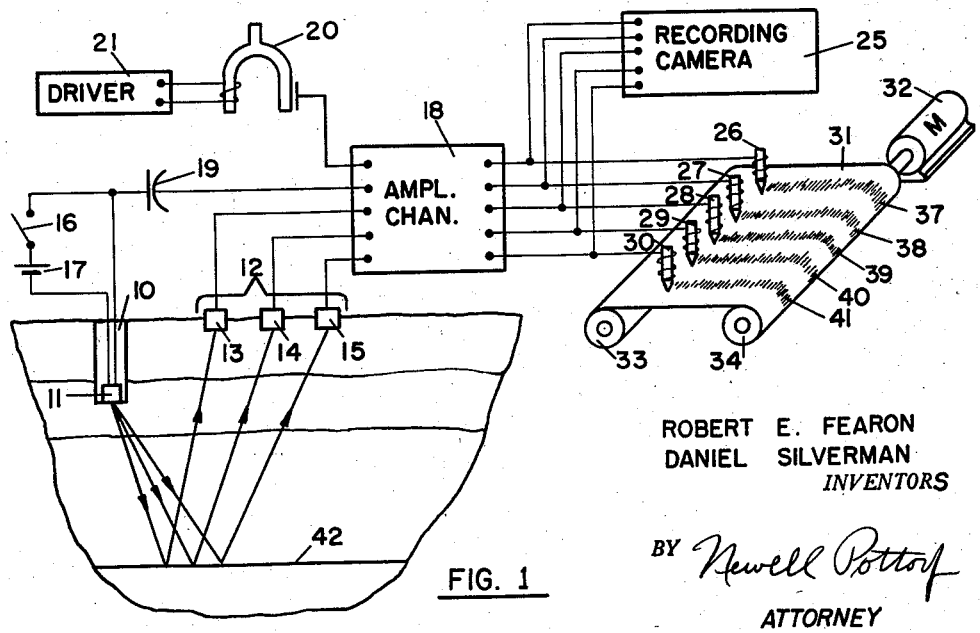

Referring now to these drawings in detail and particularly to Figure 1 thereof, at a shot point 10 is located an explosive charge or charges 11, which may be in a hole in the earth as shown or in any other desired position such as in the air above the earth, which charge (or charges detonated substantially simultaneously) forms the seismic wave-creating means. Spaced from shot location 10 is a spread 12 of seismometers containing, for example, the three individual seismometers 13, 14, and 15. Connected to the detonator of charge 11 by insulated electrical leads through a switch 16 is a battery 17 which serves to detonate the charge 11 when switch 16 is closed.

Appropriate electrical leads from the seismometers 13, 14, and 15 extend to a multiple-channel amplifier 18, which is connected also to the charge-detonating circuit through a condenser 19 to indicate the time of detonation of charge 11 and to a timing circuit, including a vibrating tuning fork 20 driven by a driving circuit 21, to provide an electrical timing wave of accurately known period. The outputs of the respective channels of amplifier 18, which may also be applied if desired to a conventional recording camera 25, are preferably applied to a recorder for making a reproducible record containing, for example, the magnetic recording heads 26, 27, 28, 29, and 30. These recording heads are positioned close to a magnetizable tape 31 which is moved at constant speed past the heads by a motor 32 from a supply drum 33 to a take-up drum 34. On traces 37 and 38 are respectively recorded the timing wave and the explosive time break; while, besides the seismic waves transmitted directly from the explosive 11 to the spread 12, the information recorded on the respective seismometer traces 39, 40, and 41 may include, for example, a seismic reflection from an interface 42 at some distance below the ground surface.

Figure 2:
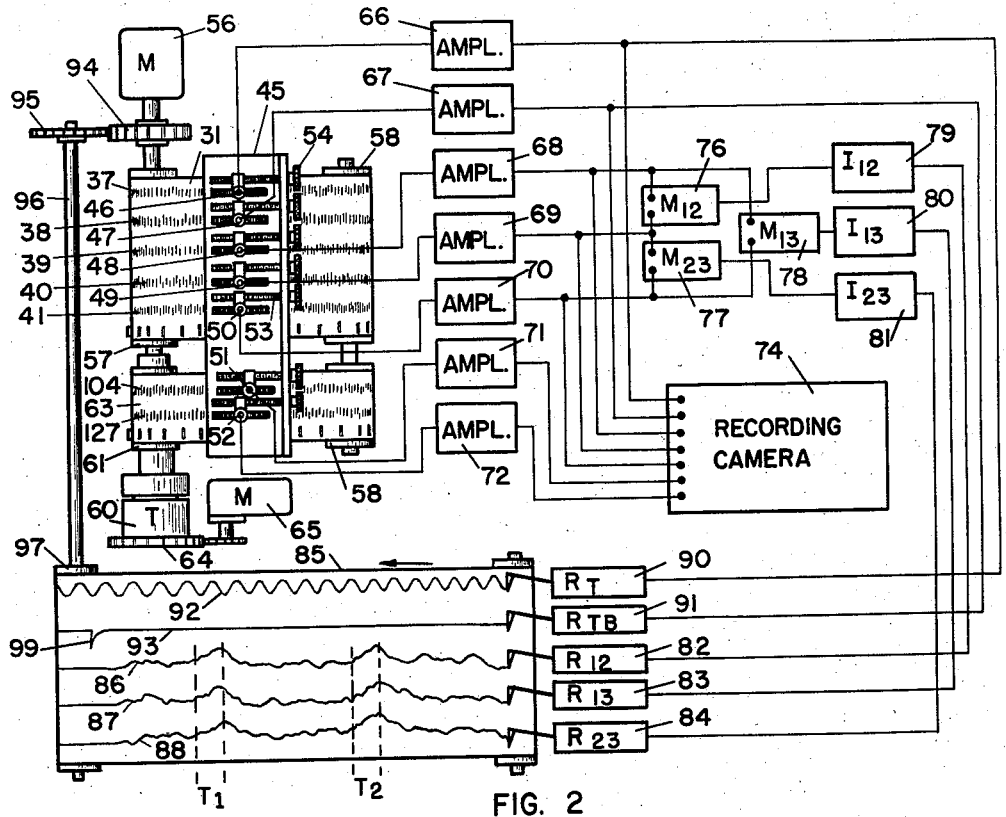
Figure 2 is a diagrammatic illustration of a reproducing and analyzing apparatus embodying one form of our invention.

Referring now to Figure 2, therein is shown one embodiment of our invention for analysis of the magnetic record 31 containing the respective parallel traces. On a cross member 45 are mounted a plurality of magnetic pick-up heads 46, 47, 48, 49, and 50 which respectively cooperate with traces 37-41, inclusive, as well as two additional pick-up heads 51 and 52. Each of these pick-up heads is movable along a slot in member 45 parallel to the respective trace by which it is energized, by means of a screw 53 which may be turned by a knurled knob 54. By this means it will be apparent to those skilled in the art that the relative positions of the various pick-up heads may be so varied as to take account of differences in weathering time between the seismometers 13, 14, and 15, as well as the so-called "normal" moveout occurring between the seismometers due to their different spacing from the shot point 10. Also, if desired, the moveout due to the dip of interface 42 may be removed, so that in effect the seismic waves on all traces 39, 40, and 41, respectively corresponding to the signals received from seismometers 13, 14, and 15, are brought exactly into phase with each other as the magnetic tape 31 is moved past the various pick-up heads.

The mechanism for handling the tape record 31 comprises the electric motor 56 driving a roller 57 about which the tape passes in the form of a belt or loop, the loop passing also over an idler roller 58. The motor 56 also drives, through a transmission unit 60, a similar roller 61 which transports past the pick-up heads 51 and 52 a magnetic tape loop 63 carrying a comparison or pattern signal for multiplication with the recorded signal traces. The transmission unit 60 includes a gear 64 which may be moved or held stationary respectively by starting or stopping a slow-speed motor 65 engaging the gear 64.

The respective pick-up heads 46-52, inclusive, are connected separately to corresponding amplifiers 66-72, inclusive, each amplifier producing an output proportional to the signal applied to it by the pick-up head to which it is connected. The outputs of the various amplifiers are separately connected to a recording camera 74, which may be similar to camera 25 in that it is able to record on visible-trace record each of the multiple signals applied to the input terminals of the camera. Thus, at any time during the analysis when it is desired to know the time relationship of the various waves being analyzed by the system, it is necessary only to make, with the camera 74, a visible record which shows the waves in their respective positions relative to each other and to the time break at that particular time in the analysis.

In accordance with our invention, the received waves from the seismometers 13, 14, and 15, respectively reproduced by pick-up heads 48, 49, and 50 and amplified by the amplifiers 68, 69, and 70, are multiplied by each other and integrated, the results of the integration being recorded on an analysis record. Thus, the outputs of the two amplifiers 68 and 69 are applied to a multiplying circuit 76 which produces an electrical function that is proportional to the product of the two input voltages; the outputs of amplifiers 69 and 70 are applied to a multiplier 77 which produces a similar product; and the amplifiers 68 and 70 are connected to the multiplying circuit 78. The output of multiplier 76 is integrated over a period of time at least equal to the seismic-wave period, and preferably somewhat longer, by an integrating circuit 79, while the outputs of multipliers 78 and 77 are similarly integrated by the integrators 80 and 81 respectively. The three integrators are respectively connected to recording voltmeters 82, 83, and 84, which produce on a moving record medium 85 the three traces 86, 87, and 88, each of which represents the varying value of one of the integrals as a function of time during the passage of the record 31 once past the pick-up heads.

Also recorded on the record 85 by the recording voltmeters 90 and 91, respectively, are the outputs of amplifiers 66 and 67 which respectively are the timing trace 92 and the time-break trace 93 indicating the instant of explosion of the charge 11. This visible record is made by moving the chart strip 85 in synchronism with the movement of the magnetic tape belt 31 by the motor 56, for example, by gearing 94 and 95 which, through a shaft 96, rotates the take-up roller 97 on which the record chart 85 is rolled.

While more latitude in adjusting the pick-up heads to remove the effects of weathering-time differentials and of moveouts is available when the field record 31 is in the reproducible form described, this record may be dispensed with and the analysis record 85 made directly in the field recording process. Thus, the outputs from the seismic signal channels of amplifier 18 can be fed directly to the multipliers 76, 77, and 78 instead of to the recording heads 28, 29, and 30. The phase relations of the signals on the different traces can be improved by incorporating delay elements in the appropriate channels or, if the seismometers are not too widely spaced and the weathering times are nearly equal, the small time differences can be disregarded and the various inputs multiplied by each other as received, without causing serious errors.

In analyzing the record 85, either by itself or in conjunction with a study of the ordinary record produced by recording camera 74, the traces 86, 87, and 88 corresponding to the multiplied and integrated seismometer outputs are examined for simultaneously increasing values of the integral. For example, as is shown over the two time intervals marked $T_1$ and $T_2$, the values of the integrals increase in a similar fashion on each of the three traces, indicating that in-phase energy appeared at all three seismometers during each time interval. Thus, by referring from this record to the conventional record or by reference to the time break and timing traces on the analysis record 85, the time of the two reflections represented by $T_1$ and $T_2$ can be found in the presence of considerable interfering noise.

In analyzing the record 85, certain changes in value of the integral, for example, such as those appearing on the trace 86, should be disregarded if they do not also appear on the parallel traces 87 and 88. In this sense the interpretation is similar to a conventional seismograph recording, in which events that do not appear on all of the multiple traces are regarded with more suspicion than those which reproduce entirely across the record. This recording can also be interpreted directly by referring the time intervals $T_1$ and $T_2$ to the time-break instant 99 on trace 93, utilizing the intervals marked off by timing trace 92 if desired, so that an interpretation may be made without reference to any conventional record. However, for those accustomed to note the character of the waves being observed, the record made by the cameras 74 or 75 may be also desirable.

In general it is possible to say that, where more than three seismometer signals are used, for example, the signals from N seismometers, seismometer groups, or channels, the maximum number of possible products which may be formed by multiplying the different outputs together is equal to $$\frac{N(N-1)}{2}$$

and in accordance with the embodiment of our invention shown in Figure 2, this is the number of products which are preferably formed, taking account, of course, of weathering and moveout time differentials by the setting of head-adjusting screws 53.

Figure 3:
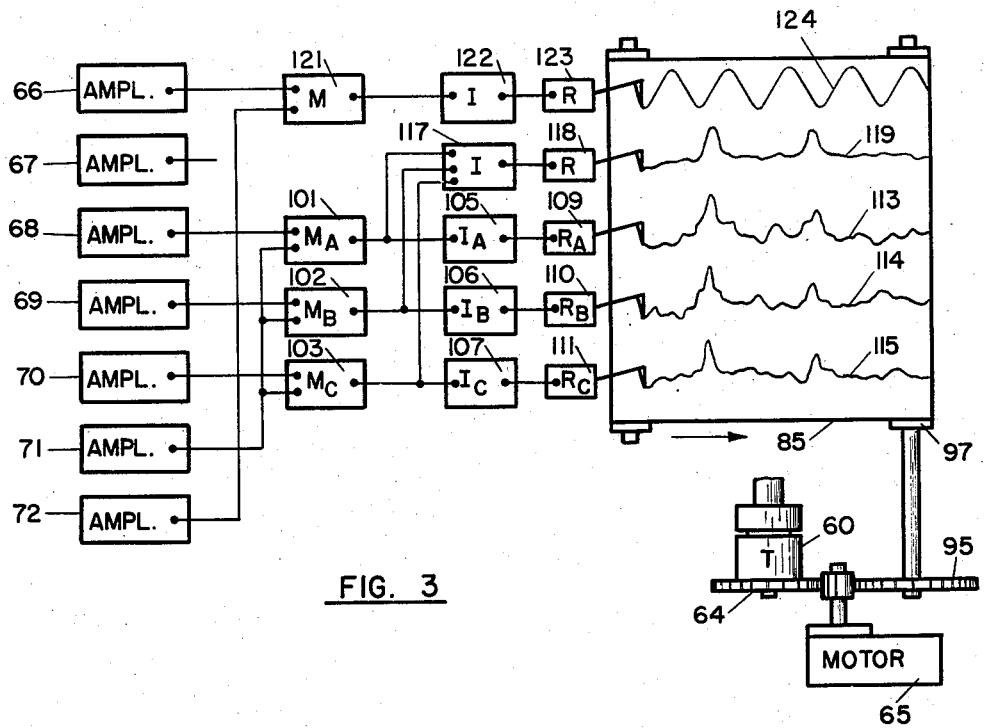
Figure 3 is a diagrammatic illustration similar to a portion of Figure 2 showing an alternative embodiment of the analyzing apparatus.

In the embodiment just described it will be noted that the tape 63 is not utilized in forming product functions, and the motor 65 engaging gear 64 of transmission unit 60 remains stationary. In the embodiment shown in Figure 3, however, this is not the case. In this latter embodiment the output of each seismometer-signal amplifier 68, 69, or 70 is applied to one of the multipliers 101, 102, and 103, each of these multipliers being fed also from the amplifier 71 which is energized by the pick-up head 51 scanning a pattern trace 104 on tape 63. The outputs of the respective multipliers 101, 102, and 103 are respectively integrated by the integrators 105, 106, and 107, which respectively actuate the recorders 109, 110, and 111, to produce on a record chart 85 the visible traces 113, 114, and 115. The outputs of the three multipliers 101, 102, and 103 are preferably also fed to a summation-integrating circuit 117 which records by a recorder 118 on the chart 85 a trace 119 representing the integral of the summation of outputs of the various multipliers. Also recorded on the chart 85 of Figure 3 is a trace 124 which is formed by multiplying the outputs of amplifiers 66 and 72 in a multiplying circuit 121, the resultant output of which is integrated in an integrator 122 and recorded by the recorder 123.

In this embodiment the takeup roller 97 of the chart 85 is driven, not by the motor 56 as in Figure 2, but by the slow-speed motor 65 engaging both the chart drive gear 95 and the gear 64 of transmission unit 60. Thus the chart 85 in Figure 3 is moved, not in accordance with the movement of tape belt 31 as in Figure 2, but rather in accordance with the differential movement between tapes 31 and 63, which is produced by slow-speed motor 65. In operation, the motor 56 operates at its usual speed, whereas the gear 64 of transmission unit 60 turns only very slowly. Thus the record 85 of Figure 3 is formed during many revolutions of the tape belts 31 and 63 rather than during a single revolution as in Figure 2.

In the operation of this embodiment, there is first placed on the trace 104 of tape 63 an idealized or pattern seismic signal, or any like signal that it is desired to look for in the recorded traces of tape 31. This may comprise, for example, a seismic wave of any length and frequency or combination of frequencies, from one or less to two or more cycles of oscillation, or it may comprise a steady-state wave of any form or frequency desired. The trace 127 on tape 63 is preferably a duplicate of timing trace 37, corresponding to the output of timing fork 20. Also it is preferred, but not essential, that the screws 53 adjusting the relative positions of all of the pick-up heads be first set so as to eliminate the effects of normal and/or dip moveouts and differential weathering times where such can be ascertained, so that all signals on all traces of the record 31 are exactly in phase as they pass underneath the respective pick-up heads. In this embodiment no use is made of the time-break amplifier 67 output, except as it is recorded in making a record of all of the traces on both tapes 63 and 31 by the recording camera 74 for ascertaining the relations between all traces at some instant during the analysis.

In operation, as the motor 56 rapidly revolves the belts 31 and 63 past the pick-up heads, the slow movement of the gear 64 by the motor 65 advances tape 63 relative to 31. The effect of this is, at some time during the process of making the record 85, to bring the pattern signal on trace 104 exactly into phase with each similar signal present in the seismometer traces 39, 40, and 41. Whenever this in-phase condition occurs, the peaks which may be noted on the traces 113, 114, and 115 are recorded. Such other peaks as may occur due to random noise having the form of a signal on any particular trace are disregarded when the adjacent traces do not have the same form. If the moveouts and other delay times such as those due to differential weathering times along the spread have been correctly removed, by setting screws 53 with knobs 54 and properly positioning the pick-up heads, then the trace 119, which is the integral of the sum of the multiplied outputs, exhibits peaks which may be clearly interpreted as due to in-phase energy on all of the traces. This trace 119 tends to average out the individual noises which make traces 113, 114, and 115 somewhat more difficult to interpret.

The trace 127 which feeds amplifier 72 and is combined in multiplier 121 with the timing trace 37, of which it is a duplicate, gives an integrated product function which is also a sinusoidal trace of the same periodicity. Thus, the trace 124 represents the displacement in time of the tape 63 relative to the tape 31, with the distance between successive peaks of the trace 124 corresponding to the same interval of time as in the timing trace 92. Thus, if the peak spacing corresponds to 10 milliseconds (as on trace 92, the fork 20 being a 100-cycle per second fork) then the peak spacing on trace 124 similarly corresponds to 10 milliseconds of time displacement of the record tape 63 relative to the record tape 31. By making a record of all traces with the camera 74 during one revolution of tapes 31 and 63 at some known time during the making of record 85 of Figure 3, the time relations between all of these different traces with respect to each other and to the time break on trace 38 may be ascertained.

Figure 4:
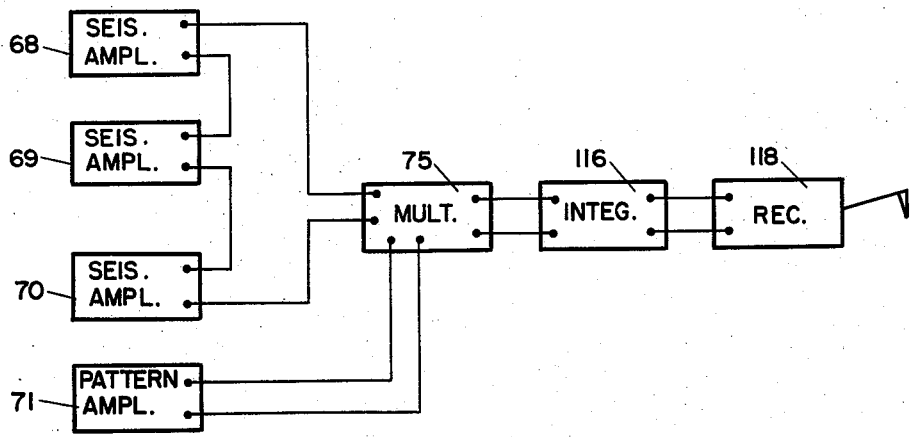
Figures 4 and 5 are diagrammatic illustrations showing different methods of compounding input signals.

In Figure 4 is shown a modification of the invention by which full advantage is taken of the ability of additive compounding to improve signal-to-noise ratios before applying the analytical process of our invention. Thus, after first removing known time-phase differences, a plurality of signal-plus-noise inputs are additively combined into a single compound signal, which is then subjected to the multiplication and integration process for picking out the signal in the presence of the noise. For example, after first adjusting out time differentials due to weathering and moveout as completely as possible by the setting of knobs 54, the outputs of the three seismometer amplifiers 68, 69, and 70 are added together in series as shown in Figure 4 (or are connected in parallel, if preferred) to provide a single compounded input signal to a multiplier 75, to which the pattern signal from amplifier 71 is also supplied. The product-function output of multiplier 75 is integrated by the integrator 116, and the result is recorded by the recorder 118 to provide a visible trace which is in essence the same as trace 119 of Figure 3. Thus, if the information of the separate traces 113, 114, and 115 is not needed for determining moveouts, for example, and if only the information of trace 119 is desired, it can be most simply provided as in Figure 4, utilizing only one multiplier and integrator channel instead of three.

The invention is applicable also to determining the degree of or time phase of correlation between signals from any two sources in which noise is also present, when it is suspected that correlation may exist. Thus, a common problem of this type in seismic exploration is that of making a proper correlation between different spreads along a line or traverse. Either or both of the signals for comparison may be single or may be additively compounded from multiple inputs. Thus, as in Figure 5, a plurality of seismometer outputs, for example, those of amplifiers 68 and 69, at one location or along one part of a spread, are first added together to form a composite signal with an improved signal-to-noise ratio due to the additive compounding. Likewise, two signals from amplifiers 68' and 69', from any other location or from a different part of a given spread, are also additively combined, and each of the two composite signals then forms one input of the multiplier 75, whose output is integrated by the integrator 116 and recorded by recorder 118.

With this modification of the invention, at least three different operating procedures are possible. The two signals for comparison can be multiplied, integrated, and recorded as a function of time, at a fixed or constant time phase as in the embodiment of Figure 2, in which case the time intervals over which increasing values of the integral are observed indicate the occurrence of correlatable signals at that particular value of the time phase. Thus, assuming that amplifiers 68 and 69 are fed from one tape 31, and amplifiers 68' and 69' from a comparison tape 63, the motor of 65 is stopped, holding transmission unit 60 stationary during the making of the record.

Figure 5:
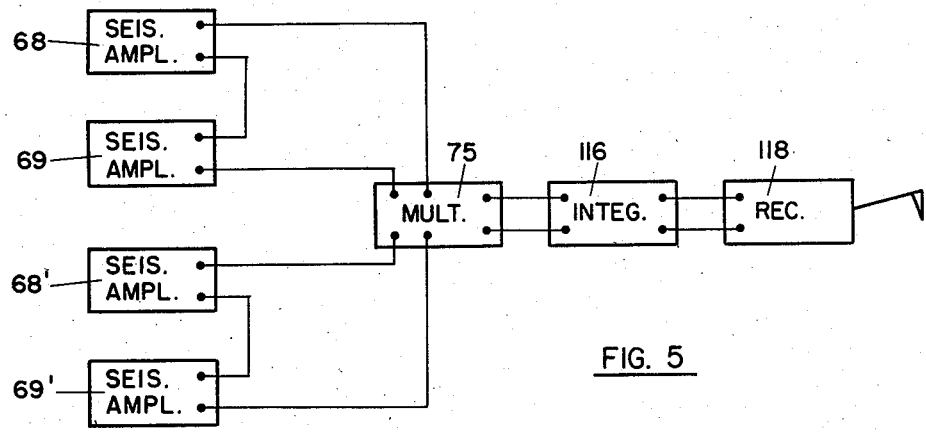

Alternatively, the signals being combined as in Figure 5 for analysis may be analyzed with varying time phase. By operating motor 65 slowly while recording the variations of integral value as a function of time, as described above, and by recording each traverse of the tapes 31 and 63 past the recording heads as a separate trace, the resulting plurality of traces, each of which corresponds to a different value of the time phase, shows both the occurrence of correlation as a function of time along the record and the time phase for which the correlation becomes a maximum.

Or if desired, the over-all correlation between the two signals of Figure 5 or any selected portions of the signals can be recorded as a function of the time phase alone, with the motor 65 running as in the case of the embodiment shown in Figure 3. From the maximum of such a record made in this way, the time-phase relation between the two signals or portions thereof for a best correlation can be read off at a glance.

Figure 6:
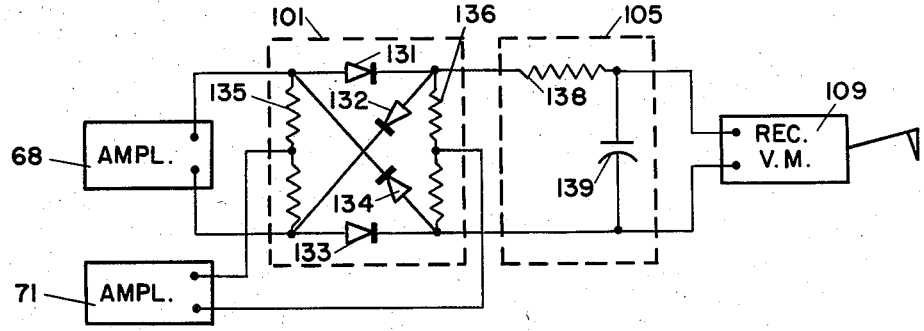
Figure 6 is a wiring diagram showing a typical multiplying and integrating channel.

In Figure 6 is shown a typical multiplying and integrating recording channel which may be used in any of the foregoing embodiments. Thus, the multiplying circuit 101, for example, which is fed by the amplifiers 68 and 71 (which are shown as connected only by single leads in Figures 2 and 3 for simplicity, but in fact are connected by pairs of such leads as shown in Figure 6) may comprise the four rectifying units 131, 132, 133, and 134 connected in series around a ring with a center-tapped input resistor 135 connected between the junction of rectifier 134 with 131 and of 132 and 133, and a center-tapped output resistor 136 connected between the junction of rectifier 131 to 132 and of 133 to 134. The output leads of amplifier 68 are connected across the ends of input resistor 135, while the output leads of amplifier 71 are preferably connected to the center taps of input and output resistors 135 and 136. The circuit output, proportional to the product of the two inputs appearing across the output resistor 136, is applied to the integrator 105 consisting of a series resistor 138 and condenser 139, the voltage across the condenser 139, representing the integral of the varying input signals over a period of time proportional to the time constant of the resistor and condenser, being applied by appropriate leads to the recording voltmeter 109. This time constant, in terms of the time interval covered on the record, is at least as great as the approximate period of the seismic wave it is desired to observe, and may be considerably longer, for example, from 50 to 100 milliseconds or more in the embodiment of Figure 2. In the embodiment of Figure 3, this time constant is preferably of the same order of magnitude as the time for each complete revolution of the tape belts.

While it is perhaps not as convenient and simple in some respects as the electrical circuits just described, a wattmeter-type element may be utilized to perform the multiplying and integration steps. By applying the two electric currents to be multiplied respectively to the moving and the fixed field coils of the wattmeter element, and assuming that the moving coil has an appreciable inertia to prevent its responding to high-frequency currents, then the resultant position of the moving coil is representative of the time average or intergral of the product of the two input functions, which is the type of response desired.

Figure 7:
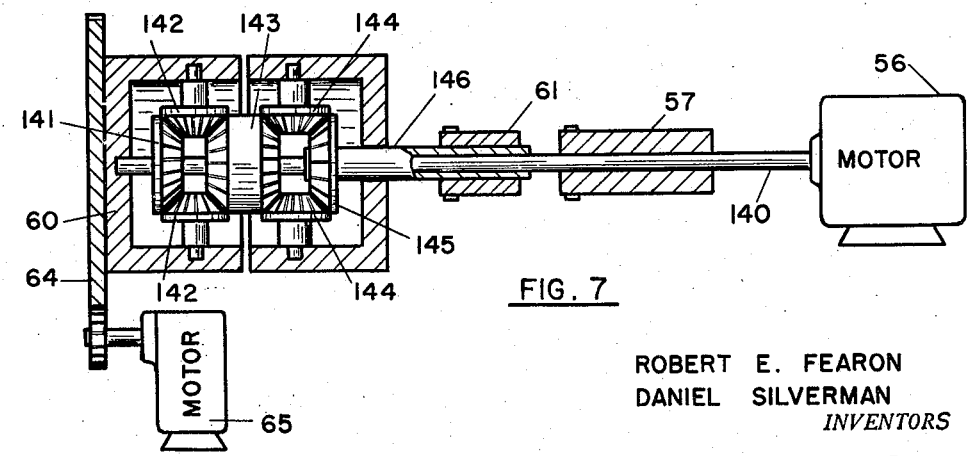
Figure 7 is a view, partially in cross section, of a record-transporting mechanism.

Referring now to Figure 7, therein is shown in some detail, with some parts in cross section, the mechanism for handling the tape belts 31 and 63 and moving one relative to the other. Thus, the motor 56 drives directly the roller 57 carrying tape 31, whereas the motor shaft 140 passes into the transmission unit 60 and is attached to a bevel gear 141. Through pinion gears 142 journaled in the housing 60, bevel gear 141 drives an idler bevel gear 143, which in turn, through a pair of bevel pinion gears 144 journaled for rotation in a stationary portion of housing 60 (not movable by the motor 65), drives a bevel gear 145 attached to a tubular shaft 146 on which the roller 61 is mounted. This mechanism operates as follows: assuming that shaft 140 is rotating clockwise, then idler 143 rotates counterclockwise at exactly the same speed as long as housing 60 is held stationary by gear 64 engaged by motor 65, not turning. The counterclockwise rotation of idler 143 is transmitted to bevel 145 as a clockwise rotation by the pinions 144, and consequently roller 61 rotates at exactly the same speed and in a clockwise direction, the same as roller 57. However, upon rotation of the movable portion of the transmission housing 60 by the motor 65, pinions 142 are shifted, and the relative rotation between bevel gears 141 and 145 is correspondingly changed. Thus, the roller 61 rotates relative to roller 57, slowly advancing tape belt 63 relative to tape belt 31 while both are rapidly moved past the pick-up heads by motor 56.

Figure 8:
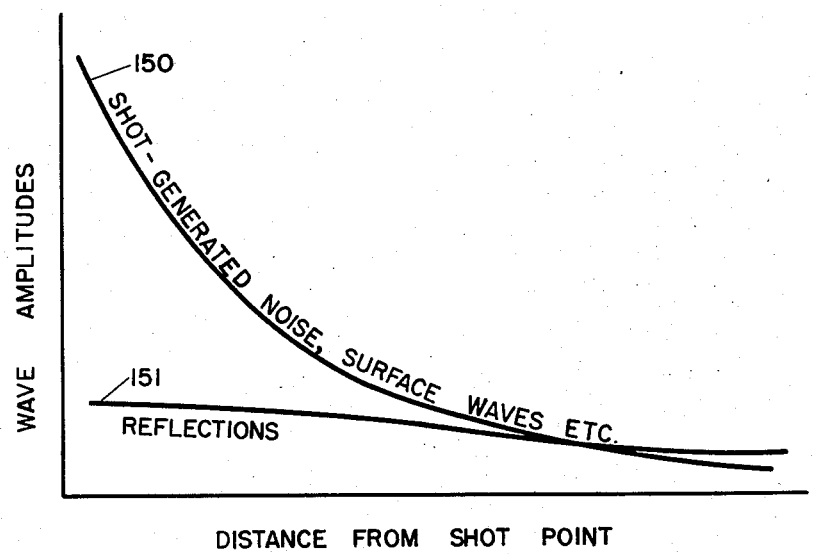
Figure 8 is a graph showing certain relations between desired energy and seismic noise energy.

In the prospecting of difficult areas by the seismic method, phenomena have been sometimes noted which are illustrated in Figure 8. In areas where the shot-generated noise and surface waves are particularly troublesome, it is frequently found that these waves are of very large amplitude near the shot point, but drop off rather rapidly in amplitude with horizontal distance away from the shot point, for example, as shown qualitatively by the curve 150 of Figure 8. The reflection amplitudes, on the other hand, while they are also largest near the shot point, apparently do not decrease with horizontal distance from the shot point as rapidly as the noise. For example, they may decrease with distance as shown qualitatively by the curve 151 of Figure 8.

Figure 9:
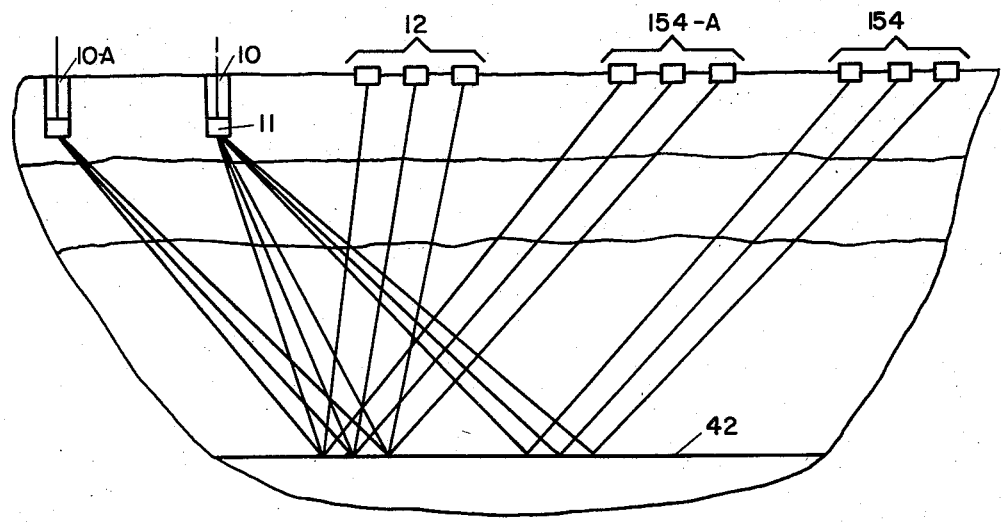
Figure 9 is a diagrammatic cross section of earth with an alternative embodiment of the invention in recording position thereon.

In our invention, advantage is taken of this effect in order to determine the wave form of the reflections that it is desired to observe in a prospecting area. The form of the wave used on the comparison or pattern trace 104 may therefore be determined in accordance with our invention by a set-up such as is shown in Figure 9. Thus, to determine the wave form for use on this trace, the spread 12 near the shot point 10 is supplemented by a second spread 154 at a much larger horizontal distance from this shot point, so that the record made at the location 154 will have a much more favorable signal-to-noise ratio, in accordance with the curves of Figure 8, than will the records made by the close-in spread 12.

The difficulty with using the events noted on the record made by spread 154 for depth determinations, however, is that the seismic energy from the charge 11 is known to travel at such large angles from the vertical through the subsurface beds to reach the spread 154 that the exact travel path is uncertain. Consequently, the reflection times noted on the distant spread 154 are not usable for accurately determining the depth to the interface 42, for example. On the other hand, the form of the reflection obtained from the interface 42 at the distant spread location 154 can be used as the wave for cross-correlation or multiplication with the record made by the spread 12 to determine, with a significant increase in signal-to-noise ratio, just at what time the desired reflection occurs on the record made with spread 12. It is thus not necessary to guess by trial and error or estimate in advance just what the form of the reflection from interface 42 is most likely to be. In an exactly similar way the forms of reflections from other beds it is desired to locate on the record made by spread 12 can be found from the record made by the distant spread 154.

In areas where the reflection character may change rapidly with lateral spread position, it will often be desirable to offset both the shot point 10 and the spread 12 so as to utilize the same subsurface reflection area of interface 42 for both the timing and the pattern records. Thus, by placing the shot at location 10-A and the spread at location 154-A as shown in Figure 9, the required spread offset distance for favorable signal-to-noise ratio is attained without substantially varying the subsurface reflection points.

While we have described our invention in terms of the foregoing specific embodiments, still further modifications will be apparent to those skilled in the art. In particular, the procedure of multiplication and integration can be carried out on electric waves obtained directly from seismometer outputs, either with or without adjustable temporary delays interposed, instead of from the reproducible records described. Likewise, delay elements can be employed with the reproducible records in place of the pick-up head adjustments. It is therefore to be understood that the described embodiments are for purposes of illustration only and that the scope of the invention is properly to be ascertained from the appended claims.

It may be noted that this application and application Serial Number 236,730 of Daniel Silverman, now Patent No. 2,779,428, disclose similar or common subject matter. The method claims of Serial No. 236,730, however, all include in one form or another the step of generating seismic waves by two or more pulses spaced in a time pattern, and the analysis of the resultant waves for seismic events of the usual form plus the time pattern. In the present invention, the claims are directed to the generation of the seismic waves by any conventional method, but the analysis is unique in that what is compared by multiplication and integration are two received seismic waves from different locations on the ground or one received seismic wave and a pattern pulse which may be of any conventional wavelet form.

We claim:

1. The method of seismic surveying which comprises creating at a given location adjacent the surface of the earth artificial seismic waves, receiving the resultant waves after travel through the subsurface at at least two points spaced from said location, slowly varying the time phase between the waves received at said at least two points, repeatedly multiplying together the waves received at said at least two points to produce a product function, repeatedly forming the integral of said product function over a period of time substantially greater than the received seismic wave period, and recording the varying value of said integral as a function of said varying time phase.

2. The method of seismic surveying which comprises creating seismic waves at a given location, receiving the resultant seismic waves after travel through the subsurface at a plurality of points differently spaced from said location, slowly varying the time phase between the wave functions received at at least two of said points at different distances from said location, repeatedly forming the multiplicative product of the wave functions received at said at least two points, repeatedly forming the integral of said product over a substantial period of time, and indicating the varying value of said integral as a function of the time phase between the wave functions.

3. The method according to claim 2 in which said product is formed from the waves recorded at a point close to said location and the waves recorded at a position distant from said location, said waves recorded at a distance having a substantially improved signal-to-noise ratio over those recorded close to said location.

4. The method of seismic surveying which comprises creating seismic waves at a given location, receiving the resultant seismic waves after travel through the subsurface at a plurality of points spaced from said location, recording said resultant waves as a plurality of traces on a reproducible record medium, reproducing said traces as a plurality of electric waves, adding said electric waves together to produce a single electric summation wave, multiplying said summation wave by an electric pattern wave having the form of a relatively noise-free seismic signal to produce a product-wave function, forming the integral of said product-wave function over a time period at least coextensive with the pattern of said pattern wave, and recording the value of said integral as a function of the time phase between said summation wave and said pattern wave while varying said time phase.

5. The method of seismic surveying which comprises receiving seismic waves at a first seismometer spread after travel through the subsurface, recording the received waves as a plurality of traces on a first reproducible seismic record, receiving seismic waves after travel through the subsurface at a second seismometer spread spaced from said first spread, recording the waves received by said second spread as a plurality of traces on a second reproducible seismic record, reproducing the traces of each of said records as a plurality of corresponding electric waves while delaying some of said waves relative to the others on the same record to bring the electric waves corresponding to desired seismic events on each record substantially into phase with each other, summing all of said electric waves for each record together to provide an electric summation wave representative of said record, multiplying the resulting two summation waves together to produce a product-function wave, forming the time integral of said product-function wave over a time interval at least equal to a seismic-wave period, and recording the value of said integral as a function of time.

6. The method of seismic surveying according to claim 5 in which said multiplying, integral-forming, and recording steps are repeated for each of a plurality of different time-phase relations between said two summation waves.

7. The method of seismic surveying which comprises receiving seismic waves after reflection by a given subsurface interface with two substantially different separations between receptor spread and shot point, recording said waves at each of said separations as a plurality of traces on a reproducible record medium, reproducing said traces as a plurality of electric waves, multiplying said electric waves corresponding to the seismic waves received at the smaller separation by the electric waves corresponding to the seismic waves received at the larger separation to provide at least one product-wave function, forming the integral of said product-wave function over a time period at least coextensive with the reflection wave from said interface received at the larger separation, and recording the value of said integral as a function of the time phase between the multiplied waves, while varying said time phase.

8. The method of seismic surveying according to claim 7 in which said waves originate at a single shot point and are received at two spreads with different separations from said shot point.

9. The method of seismic surveying according to claim 7 in which said waves are received at a single spread after originating at two different shot points differently spaced from said spread.

10. The method of seismic surveying according to claim 7 in which said seismic waves received at said two separations are reflected from substantially the same points of said subsurface interface.

References Cited in the file of this patent

UNITED STATES PATENTS

| | | |
|---|---|---|
| 2,306,456 | Mayne | Dec. 29, 1942 |
| 2,394,990 | Eisler et al. | Feb. 19, 1946 |
| 2,521,130 | Scherbatskoy | Sept. 5, 1950 |
| 2,638,402 | Lee | May 12, 1953 |